INVENTOR.
PAUL REKETTYE
BY Ely, Frye & Hamilton
ATTORNEYS

Dec. 2, 1958  P. REKETTYE  2,862,237
MULTIPLE CAVITY MOLD CHARGING DEVICE
Filed Jan. 6, 1954  4 Sheets-Sheet 2

INVENTOR
PAUL REKETTYE
BY
ATTORNEYS

Dec. 2, 1958 P. REKETTYE 2,862,237
MULTIPLE CAVITY MOLD CHARGING DEVICE
Filed Jan. 6, 1954 4 Sheets-Sheet 3

INVENTOR.
PAUL REKETTYE
BY
ATTORNEYS

Dec. 2, 1958 P. REKETTYE 2,862,237
MULTIPLE CAVITY MOLD CHARGING DEVICE
Filed Jan. 6, 1954 4 Sheets-Sheet 4
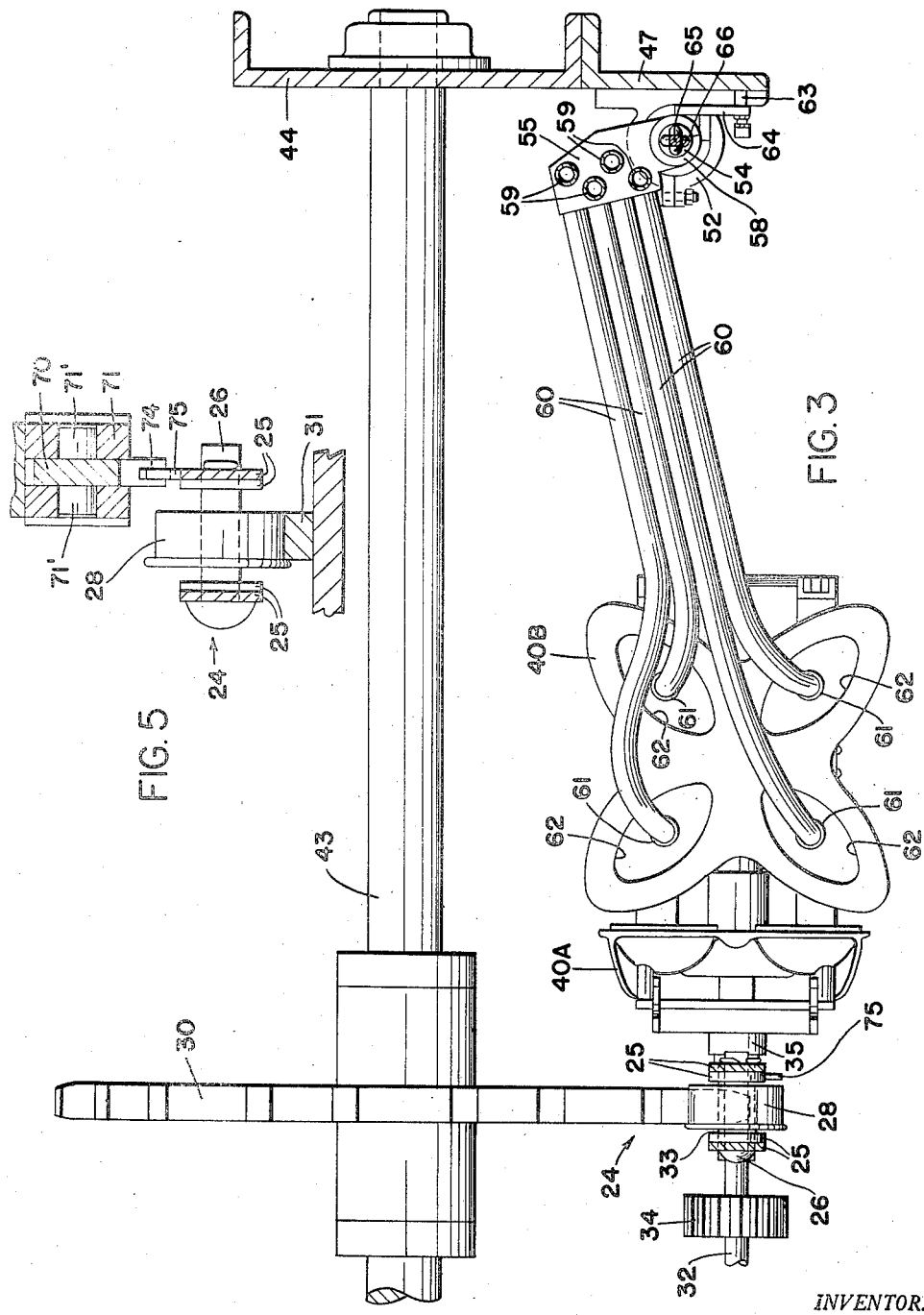
INVENTOR.
PAUL REKETTYE
BY Ely, Frye & Hamilton
ATTORNEYS United States Patent Office 2,862,237
Patented Dec. 2, 1958

2,862,237

MULTIPLE CAVITY MOLD CHARGING DEVICE

Paul Rekettye, Akron, Ohio, assignor to The Sun Rubber Company, Barberton, Ohio, a corporation of Ohio Application January 6, 1954, Serial No. 402,488

2 Claims. (Cl. 18—26)

The invention relates generally to apparatus for the internal casting of hollow flexible articles such as dolls and figure toys from plastic materials, including thermal-setting resins such as vinyl polymers and copolymers. More particularly, this invention relates to a device for charging multiple cavity molds used on such apparatus.

United States Letters Patent No. 2,629,131 discloses a casting machine in which a series of single cavity molds are carried along on a conveyer and automatically opened, charged, closed and clamped shut at different stations, and then passed through af using oven while rotating in a plurality of planes to produce a fused shell on the interior of the mold. When multiple cavity molds are used, larger and more positive clamping means are required to hold the mold sections tightly closed against the expanding pressure generated by the gases in the mold cavities, which tends to form a flash at the parting line of the mold. This makes it desirable in certain cases to utilize manual clamping means for the molds, with the result that more flexibility in time is required for the operations of opening the molds, removing the cast articles, charging the molds, and closing and clamping the molds, as they are carried along on the conveyer.

It is an object of the present invention to provide a novel and improved charging device for depositing a measured charge of liquid plastic material in each of the cavities of a series of multiple cavity molds carried along on the conveyer of a casting machine.

Another object is to provide an improved charging device for filling multiple cavity molds moving along on a casting machine, which device will move in accompaniment with each mold during a portion of its travel.

A further object is to provide an improved charging device which will move in an inoperative position in accompaniment with each mold during a portion of its travel, and which can be swung into charging position at any time during its accompanying travel.

These objects and others which will become apparent from the following description, are accomplished by the improvements comprising the present invention, a preferred embodiment of which is illustrated in the accompanying drawings as exemplifying the best known mode of carrying out the invention. The embodiment shown by way of example is described in detail in the following specification, and defined in the appended claims, various modifications being comprehended within the scope of the said claims.

Referring to the drawings:

Fig. 3 is a similar view showing the device in charging position in relation to an open mold;

Fig. 5 is a fragmentary vertical sectional view taken on line 5—5, Fig. 4.

Figure 1:
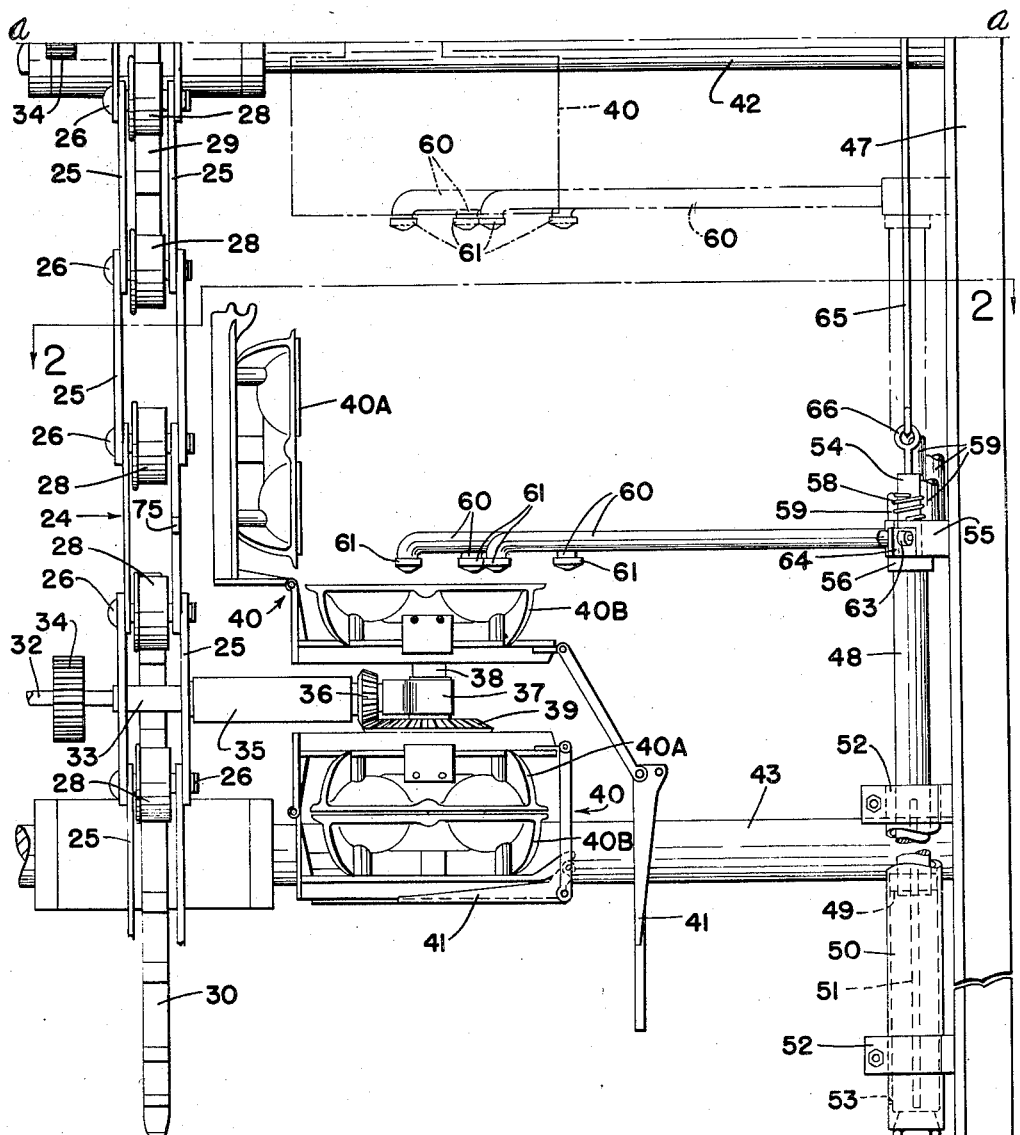
Fig. 1 is a front elevation of the lower portion of a casting machine embodying the novel charging device.
Figure 1A:
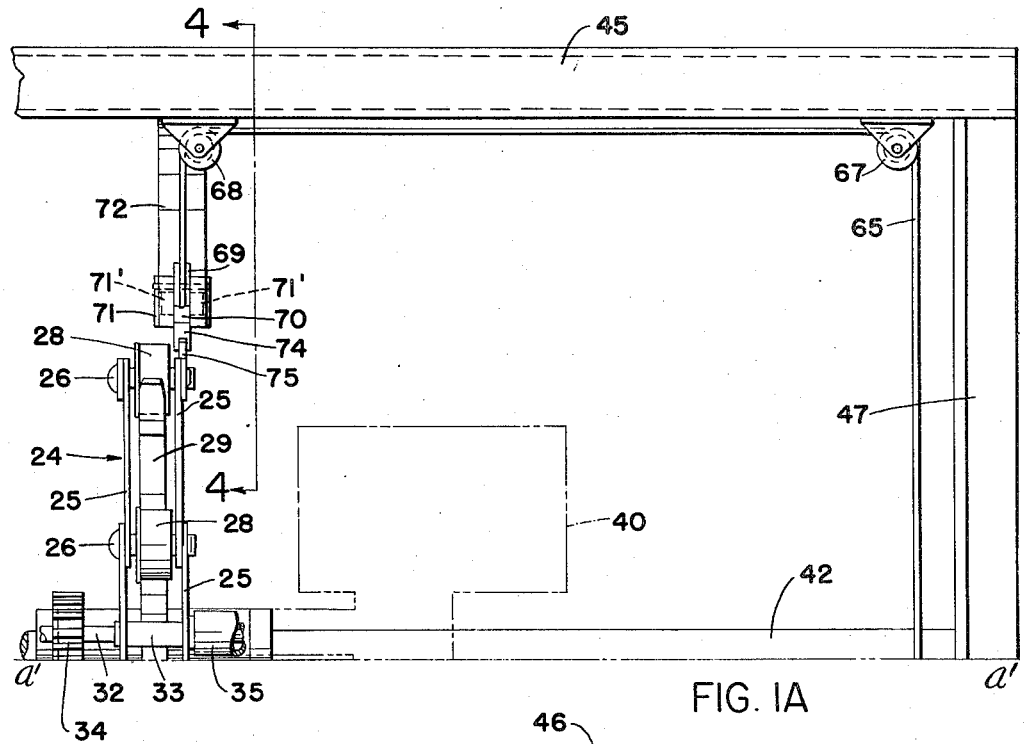
Fig. 1A is a front elevation of the upper portion of the casting machine, continuing upwardly from the top of Fig. 1.

Referring to Figs. 1 and 1A, the vertical run of the conveyer which carries the molds through a casting machine of the type shown in Patent No. 2,629,131, is indicated generally at 24. The conveyer comprises a chain made up of two sets of pivoted links 25 connected by transverse pins 26. A flanged wheel 28 is journaled on each pin, and the wheels engage in notches on the upper and lower sprockets 29 and 30 over which the conveyer chains pass, moving from the lower sprocket 30 to the upper sprocket 29. The wheels 28 roll on supporting rails 31 at the top of the machine (Fig. 4) and on similar rails (not shown) at the bottom of the machine.

The molds are carried at intervals on the chain 24, by means of shafts 32 journaled in sleeves or bushings 33 welded or otherwise secured in opposite links 25 of the chain. A pinion 34 is secured on each shaft 32 adjacent to the chain, and the pinions are adapted to mesh with a rack (not shown) supported on the upper horizontal part of the machine, which causes the shafts and the molds carried thereby to rotate as they pass through a fusing zone. The shafts 32 may be journaled in two parallel chains running side-by-side and each carrying molds, with the pinions 34 between the chains. In order to obtain adequate space for opening and closing the molds, the molds carried on each chain may be spaced apart a substantial distance longitudinally of the chain, but the molds on the two chains may be staggered with respect to each other.

Each shaft 32 extends through and is journaled in a stationary arm 35 and bevel pinion 36 secured therein, and the shaft is non-rotatably connected to a yoke or bearing collar 37 in which a transverse shaft 38 is journaled. Sectional molds in holders, constituting mold assemblies indicated generally at 40, are detachably mounted on the ends of transverse shaft 38 and a bevel gear 39 secured on shaft 38 meshes with the pinion 36. Thus, when the shaft 32 is rotated, the molds 40 will be bodily rotated about the axis of shaft 32, while the gears 36 and 39 are rotating the molds on the axis of shaft 38.

For the purpose of the present invention, it is sufficient to say that the mold sections are mounted in holder frame sections which are hinged together at one end for opening the mold and having clamping means at the other end for holding the mold sections closed in mating relation, the clamping means being operable from the outer side of the holder opposite to the inner side which is mounted on the transverse shaft 38. As shown in Fig. 1, the upper mold assembly including mold sections 40A and 40B is open, with the clamping handle 41 hanging downwardly from the open end of section 40B, while the lower mold assembly is closed with the clamping handle against the outer side of the holder.

Figure 4:
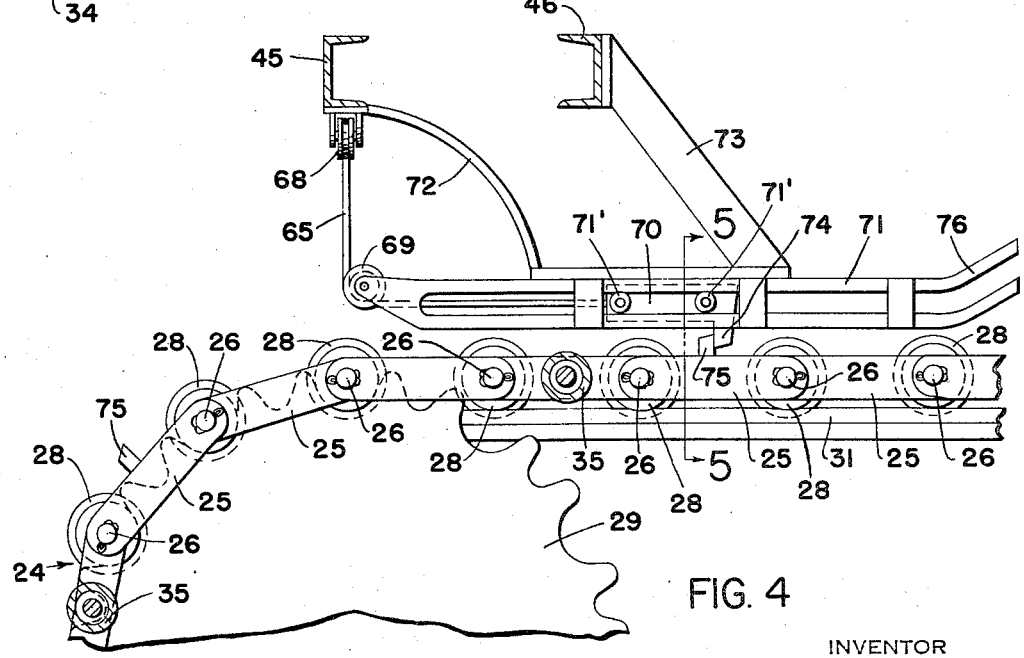
Fig. 4 is a fragmentary vertical sectional view taken on line 4—4, Fig. 1A.

The sprockets 29 and 30 which carry the chain 25 are mounted on shafts 42 and 43 respectively, the ends of which are journaled in suitable bearings mounted on upright channel frame members 44 at opposite sides of the front of the machine (one channel being shown), and the channels 44 are tied together at their upper ends by cross channels 45. As shown in Fig. 4 another cross channel 46 may be provided paralleling channel 45. An upright angular frame member 47 is secured to the front leg of channel 44.

The novel and improved charging device is movably mounted on the vertical angle bar 47. The device includes a vertical piston rod 48 having a piston 49 at its lower end reciprocable in a cylinder 50, the piston being splined to said cylinder, as indicated at 51, to prevent relative rotation of the piston. The cylinder 50 is non-rotatably mounted on the bar 47 by spaced clamping yokes 52. The bottom end of the cylinder is provided with an air vent 53. The upper end of the piston rod 48 has a reduced portion 54 on which the charging nozzle connector block 55 is rotatably supported by a shoulder 56 on the rod 48. A coil spring 58 surrounding portion 54 of the piston rod has one end secured to the rod and the other end to the connector block 55 for urging the block to the position of Fig. 2 where it abuts the inner faces of frame members 44 and 47.

Figure 2:
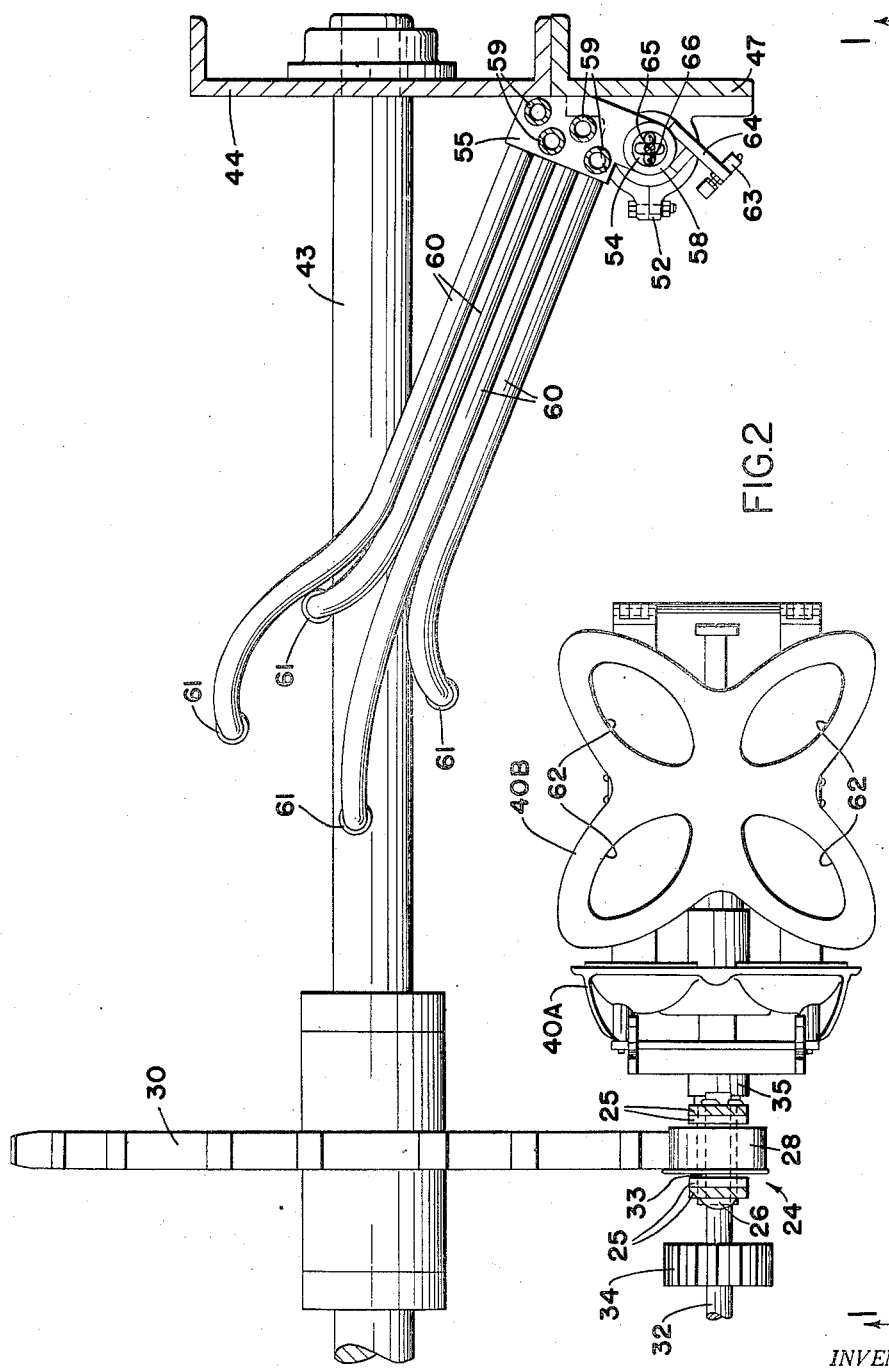
Fig. 2 is a plan sectional view, as on line 2—2 of Fig. 1, showing the charging device in inoperative or non-charging position.

Flexible tubes 59, one for each mold cavity, are connected into the upper surface of the block 55 for supplying liquid plastic material such as vinyl resin, and connecting passageways in the block conduct the liquid material to the several rigid nozzle pipes 60 (four being shown) projecting from the block laterally inward of the machine. The several lengths of the pipes 60 are made so that the nozzles 61 at the outer end can be made to register simultaneously with the several mold cavities indicated at 62 in a mold section 40B when the mold is horizontal and crosswise of the machine. In the position of Fig. 2 the nozzles are held in inoperative position by the spring, and in the position of Fig. 3, they are swung to operative position with the nozzles 61 each registering with a mold cavity 62.

The nozzles 61 may be swung to the operative position mechanically or manually, and in the construction shown they may be swung manually by grasping the nozzle pipes 60 and swinging them outwardly by hand. A stop is provided for locating the nozzles over the mold cavities and the stop may be a limit switch 63 adjustably mounted on the arm 64 of a bracket carried on the block 55 for abutting the inner face of bar 47 when the nozzles are in register with the mold, as shown in Fig. 3. Preferably, the limit switch 63 is operatively connected in a well-known manner to a suitable pump of the type disclosed in Patent No. 2,629,131 for delivering a measured quantity of liquid plastic material from the nozzles when the switch is operated by contact with bar 47.

The nozzles are made to travel with the conveyor for a part of its upward travel from sprocket 30 to sprocket 29. For this purpose a cable 65 is connected to a screw eye 66 secured in the top end 54 of the piston rod, and the cable passes over pulleys 67 and 68 journaled in brackets on the cross beam 45. As shown in Fig. 4, the cable 65 passes from pulley 68 over a pulley 69 and is connected to a carriage 70 movable on a track 71 by rollers 71' supported on brackets 72 and 73 depending from the cross beams 45 and 46 respectively. The carriage 70 has a depending arm 74 which is adapted successively to be engaged by a series of dogs 75 projecting upwardly at intervals from the conveyor chain, for moving the carriage rearwardly of the machine along with the upper horizontal run of the conveyor. At its rear end, the track inclines upwardly as indicated at 76 to release the carriage from its engagement with each dog 75 on the conveyor after the carriage has accompanied the conveyor for a predetermined distance equal to the length of the horizontal portion of the track.

The dogs 75 on the conveyor are correlated to location of the mold carrying arms 35 on the conveyor, so that as an arm 35 is moved slowly upward at the lower front area of the machine by the conveyor, a dog 75 at the top of the machine moves the carriage rearwardly and raises the piston rod and the nozzles 61 carried thereby upwardly alongside of the upper mold 40A carried by the arm. The nozzles are normally held in the inoperative position of Fig. 2 by spring 58 as they move upwardly with the mold. While the molds are traveling from a lower position to an upper position (indicated by chain lines in Figs. 1 and 1A) the operator has time successively to grasp each of the closed molds coming from the casting machine, turn it to a horizontal position crosswise of the machine, release the clamps 41 to open the mold as shown in Fig. 1 and remove the cast articles therefrom; and then to swing the nozzles into registering position with the mold cavities until they are filled, release the nozzles and close the mold.

When the charged molds reach the upper position indicated by the chain lines, the carriage 70 is released by inclined track portion 76 and the piston rod 48 and the nozzles drop by gravity to the lower position. As the piston drops the vent 53 regulates the escape of air from the cylinder 50 and cushions the fall.

The period of time during which the nozzles move in a non-registering position alongside of the molds on the conveyor allows the operator flexibility with respect to the time of charging the molds, so that if his time varies in respect to any of the mold opening, unloading and mold positioning operations, he can compensate by varying the time of positioning the charging nozzle over the mold to fill the mold cavities.

What is claimed is:

1. In a machine for casting articles in sectional molds and having a frame, a conveyer mounted on the frame, and sectional molds mounted on the conveyer at intervals, a charging device having a nozzle, means mounting the charging device on the frame for movement with the conveyer, a track section paralleling the conveyer, a carriage movable on said track section, means on the carriage for engaging the conveyer to move the carriage therewith, means on the track for disengaging the carriage, means connecting said carriage to said charging device for moving the charging device with each mold during part of its travel, and means normally holding the charging nozzle in inoperative position relative to the mold.

2. In a machine for casting articles in rotatable sectional molds and having a frame, a conveyer mounted on the frame, and successively movable horizontally and vertically through a series of stations in a closed path, said molds being mounted on the conveyer at intervals, a mounting element movable vertically on the frame with the conveyer, a charging device rotatably mounted on said element, a nozzle on the charging device adapted for swinging laterally over each mold during a portion of its vertical travel on the conveyer, a carriage horizontally movable with the conveyer, means connecting said carriage to said charging device, means on the conveyer to engage the carriage and move the charging device vertically with and adjacent to each mold during a portion of its travel, and means normally holding the charging nozzle in inoperative position relative to the mold.

References Cited in the file of this patent

UNITED STATES PATENTS

| | | |
|---|---|---|
| 1,515,488 | Johnson et al. | Nov. 11, 1924 |
| 2,284,332 | McCann | May 26, 1942 |
| 2,629,131 | Martin et al. | Feb. 24, 1953 |

FOREIGN PATENTS

| | | |
|---|---|---|
| 652,418 | Great Britain | Apr. 25, 1951 |